Figure 1:
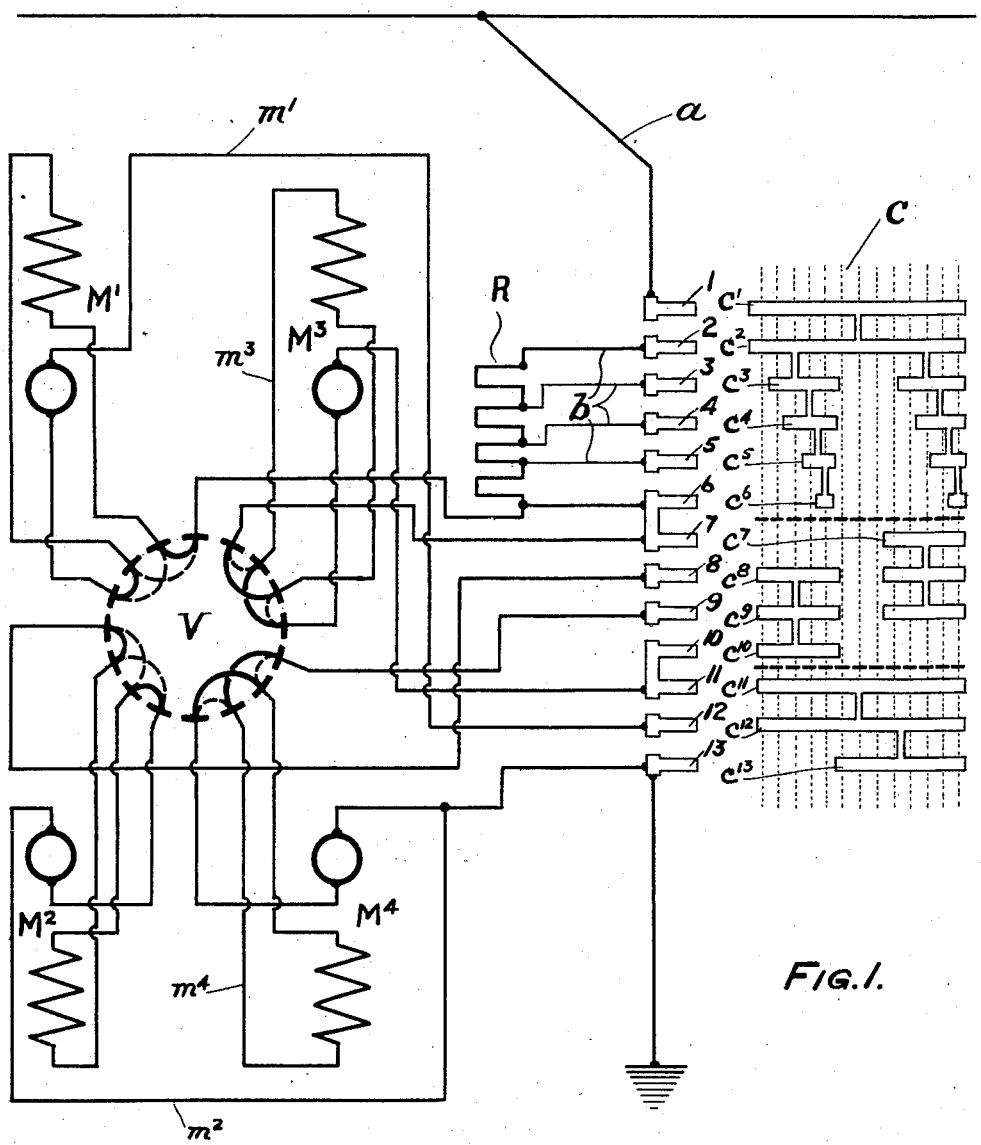

A. B. STITZER.
CURRENT CONTROLLING MECHANISM FOR RAILWAY MOTORS.
APPLICATION FILED FEB. 18, 1909.

929,338. Patented July 27, 1909.

2 SHEETS—SHEET 1.

WITNESSES:
Rob R Kitchel
A. M. Urian

INVENTOR
Arthur B. Stitzer
BY
Harding & Harding
ATTORNEYS.

A. B. STITZER.
CURRENT CONTROLLING MECHANISM FOR RAILWAY MOTORS.
APPLICATION FILED FEB. 18, 1909.

929,338.

Patented July 27, 1909.

UNITED STATES PATENT OFFICE.

ARTHUR B. STITZER, OF PHILADELPHIA, PENNSYLVANIA.

CURRENT-CONTROLLING MECHANISM FOR RAILWAY-MOTORS.

No. 929,338. Specification of Letters Patent. Patented July 27, 1909.

Application filed February 18, 1909. Serial No. 478,564.

*To all whom it may concern:*

Be it known that I, ARTHUR B. STITZER, a citizen of the United States, residing at Philadelphia, county of Philadelphia, and State of Pennsylvania, have invented a new and useful Improvement in Current-Controlling Mechanism for Railway-Motors, of which the following is a full, clear, and exact description, reference being had to the accompanying drawings, which form a part of this specification.

In the operation of a four motor electric railway car, with the ordinary schemes of connection, the reverse cylinder is frequently damaged and the contact fingers sometimes burned to an extent that renders the reverser inoperative. Such damage cannot be attributed to any ordinary conditions that are well recognized as an efficient cause of excessive burning of switch contacts, and it has therefore been attributed to causes more or less obscure. I have discovered that the damage in question is produced when the reverser is turned from the forward to the reverse position and back again while the car is in motion and while, of course, the controller is in the off position. The reason why this operation, under the conditions stated, is highly injurious to the reverser is as follows: If the armature of a series motor is revolving in either direction and working as a motor, and the source of supply disconnected and the connections to the armature (or field) reversed, it is in condition to act as a series generator, provided the armature and field are arranged in a closed loop circuit and provided the direction of rotation be maintained by the inertia of the moving parts or the momentum of the car. The direction of flow of the current through the field and armature will depend entirely upon the residual magnetism of the fields. This local current once started will rapidly increase in value, and if the reverser is turned to its original position, serious arcing occurs at the contacts, damaging the reverser and thereby putting the controller out of service.

The ordinary scheme of connections for a four motor car involves the maintenance of a closed loop circuit permitting the condition just explained to arise. That is, the motors are divided into two pairs or sets, each set being permanently in parallel when the current is shut off as well as at all positions of the controller. In other words, the individual motor circuit including in series each field and armature of a motor is connected at the ends with another individual motor circuit, thus forming a closed loop circuit in which the armature and field of each motor, and also the two motors, are arranged in series. If, therefore, while the car is in motion, the connections to the armature be reversed, the terminals of one motor of each pair are bridged with the other motor of the same pair, and the conditions above described are therefore produced in a magnified form, as there are two sets of generators each consisting of two generators connected in series.

The object of my invention is to prevent the damage in question and in accomplishing this object I eliminate the conditions above described by arranging the connections so that when the controller is moved to its off position the circuit in the loop including the motors of a pair is opened and when moved to its first running position the loop circuit is closed, permitting the current to flow through the motors in parallel. I have devised several means by which this mode of operation may be effected, while otherwise permitting the regulation of the motors in any of the different ways found to be efficient in practice.

In one form of my invention, the ordinary construction of the controller is unchanged and the motor circuits and their connection to the fixed contacts of the controller not substantially altered except that they are normally open and are adapted to be closed by means exterior to, but controlled by, the controller; such means being arranged to be operated to close or open the motor circuits when the controller is moved respectively from or to its off position. This form of my invention is not herein illustrated or specifically described, as it forms the subject-matter of another application Serial No. 478,565, filed of even date herewith, and is not herein specifically claimed. In another form of my invention, the construction of the controller and the connections of the motor circuits to the controller are modified and rearranged so as to close the local circuits through the controller itself when the latter is moved to its first running position, and leave open one end of each armature and field circuit when the controller is moved to its off position so that a local current cannot be developed in these motors acting as generators in case the armature or field connections are reversed. Two embodiments of this form of the invention are diagrammatically illustrated in the drawings, although the claims herein are not intended to be limited to such embodiments or even, except where clearly specified, to that form of the invention wherein the local circuits are cut in and out directly through the controller fingers, as both forms of the invention have common subject-matter that is intended to be within the purview of this patent.

Figure 2:
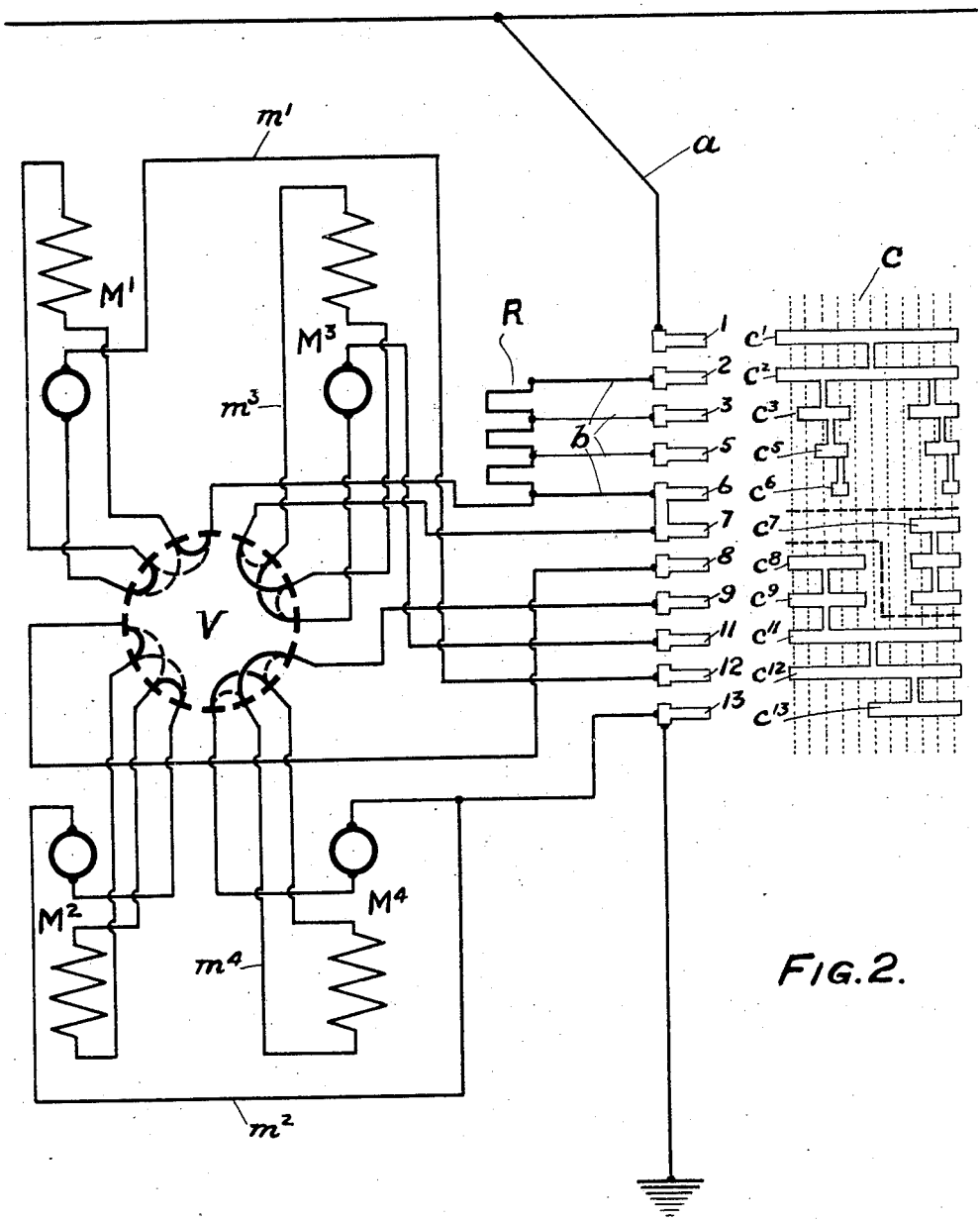

In the drawings: Figures 1 and 2 are diagrammatic views of two embodiments of my invention, each representing the motors, the controller, the reverser, the motor circuits and the resistances.

Referring first to Fig. 1, C represents the controller, whose cylinder or drum has on its periphery the series of contact plates $c'$ to $c^{13}$ inclusive. 1 to 13 inclusive represent the line of stationary brushes adapted to make contact with the plates $c'$ to $c^{13}$ respectively in the rotation of the controller cylinder. $a$ represents the conductor leading from the trolley to the first brush 1 of the controller. R are resistances connected to brushes 2, 3, 4 and 5 by the wires $b$ and which are adapted to be successively cut in and out by the controller in the usual manner. V represents the reverser. $M'$, $M^2$, $M^3$ and $M^4$ represent the four motors geared in rotation to the four axles of the car. $m'$, $m^3$ represent the branch circuits in which the motors $M'$ and $M^3$ are respectively included, and $m^2$, $m^4$, the branch circuits in which the motors $M^2$ and $M^4$ are respectively included. As the drawing shows, one branch $m'$ extends from the resistances R to reverser V, thence to the field of motor $M'$, thence to reverser V, thence to the armature of motor $M'$ and thence to brush 12 of the controller. The branch $m^3$ extends from brushes 6, 7, to reverser V, thence to the field of motor $M^3$, thence to reverser V, thence to the armature of motor $M^3$ and thence to brush 11 of the controller. It will be noted that each motor circuit is left open at one end, namely at the brushes 11 and 12.

The branch $m^2$ in which motor $M^2$ is included extends from brush 8 to reverser V, thence to the field of motor $M^2$, thence to reverser V, thence to the armature of motor $M^2$, and thence to the brush 13, which connects to ground. The branch $m^4$ extends from brush 9 to reverser V, thence to the field of motor $M^4$, thence to reverser V, thence to the armature of motor $M^4$ and thence to brush 13. It will be noted that each motor circuit is left open at one end, namely at the brushes 8 and 9.

The course of the motor circuits through the reverser V when the same is moved to the reverse position is indicated by dotted lines, from which it will be noted that the current is reversed through the fields of the several motors.

It will be obvious that when the controller is in an off position and the reverser is operated (which, in the modern controlling systems, is the only position of the controller that allows the reverser to be moved) the local or loop circuit, $m'$, $m^3$, connecting the motors $M'$ and $M^3$ in parallel, is open between the brushes 11 and 12, while the local or loop circuit $m^2$, $m^4$, connecting the motors $M^2$ and $M^4$ in parallel, is open between the brushes 8 and 9. It is obvious, under these conditions, that the motors cannot act as generators.

In the operation of the controller from the off position plates $c'$ and $c^2$ first contact with brushes 1 and 2 respectively. Immediately thereafter, and at the first running position of the controller, plates $c^8$ to $c^{12}$ inclusive contact respectively with brushes 8 to 12 inclusive. It will be noted that plates $c^{11}$ and $c^{12}$ are electrically connected, as are plates $c^8$, $c^9$, and $c^{10}$ and brushes 10 and 11. Motor circuit $m^3$ is thus connected, through brush 12, plates $c^{12}$ and $c^{11}$ and brush 11, with motor circuit $m'$; and motor circuits $m^2$ and $m^4$ are likewise connected through plates $c^8$ and $c^9$. Current passes from motor circuits $m'$, $m^3$, to motor circuits $m^2$, $m^4$, by reason of the permanent connection between brushes 10 and 11 and between fingers $c^9$ and $c^{10}$. The current now flows from the trolley through the resistances, in parallel through motors $M'$ and $M^3$ to the controller, and thence in parallel through motors $M^2$ and $M^4$ to ground. It is unnecessary to trace the course of the current through the motors at each running position of the controller, as this will be apparent from an examination of the diagram. It should be noted that when the controller is moved to the off position, the circuit is broken at seven different points, first on five points, 8 to 12 inclusive and then immediately afterward on two points 1 and 2. It will also be noted that each point, 8, 9, 11 and 12, breaks only half the total current, (only point 10 breaking the total current) followed immediately by the total current on two points 1 and 2. The danger of burning off the controller fingers is thus minimized. It is also preferable, as shown, to break the motor circuits just before opening the connection to the trolley, rather than the reverse. These, however, are not essential features.

In Fig. 2, the motor circuits are the same as in Fig. 1, the only change being in the controller, which, in Fig. 2, contains two offset segments and eleven contacts, while in Fig. 1, the controller contains no offset segments and thirteen contacts. The contacts in the controller of Fig. 2 corresponding to those of the controller of Fig. 1 are correspondingly marked and it will be noted that the plate $c^4$ and the corresponding brush 4 connected to the resistance R are omitted, as are also the plate $c^{10}$ and the corresponding brush 10. It will also be noted that plates $c^{11}$ and $c^9$ are permanently connected. The motor circuits are therefore opened and closed, as in Fig. 1, through brushes 11 and 12 and brushes 8 and 9.

It will be noted that when the controller of Fig. 2 is moved to the off position, the current is broken at six different points, first on four points 8, 9, 11 and 12, and immediately afterward on points 1 and 2.

The advantage of the embodiment of my invention illustrated in Fig. 2 over that of Fig. 1 is that it involves no change in the size of the controller, and no increase in the number of contact fingers, as compared with the ordinary controller now in use for regulating a four motor system. This advantage, however, is more than offset by the advantage, in the controller of Fig. 1 over that of Fig. 2, of maintaining the usual number of resistance points, breaking the circuit on one additional point, and building the controller without any offset segments.

The two embodiments of my invention herein described are of course merely illustrative, and many variations therefrom may be worked out without departing from the spirit of my invention.

I am aware that in that type of four motor car in which, in the first running positions, the circuit flows through the armatures of a pair of motors in parallel and through the fields of a pair of motors in parallel, the loop circuit including either a pair of armatures or a pair of fields is broken at the contacts of the controller; but in this type of controller, wherein no closed loop including the armature and field of a single motor, much less the armatures and fields of a pair of motors, is formed in moving from the "off" position to the first running position, the problem arising in the scheme of motor connections to which my invention is addressed does not and cannot arise. I do not therefore herein claim broadly means controlled by the controller to open and close the circuit, in moving to or from the "off" position, through a pair or set of motors or motor elements, but only such means when adapted to be arranged to open and close the circuit through a loop including in series a set of motors whose armatures and fields are respectively arranged in series.

Having now fully described my invention, what I claim and desire to protect by Letters Patent is:—

1. The combination with a set of motors and a controller, of an electric circuit in which the armature and field of a motor are normally arranged in series and in which said motors are normally arranged in a loop to permit their operation in parallel, and means controlled by the controller to open and close the circuit at a point in the loop including the several motors.

2. The combination with a set of motors and a controller, of an electric circuit in which the armature and field of each motor are normally arranged in series and in which said motors are normally arranged in a loop to permit their operation in parallel, and means controlled by the controller to open or close the circuit at a point in the loop including the several motors and also at a point outside the loop to cut off or admit current to the circuit.

3. The combination with a set of motors, of a source of electric supply, an electric circuit, branches, arranged in multiple in the circuit, in each of which the armature and field of a motor are normally included in series, a controller, and means controlled by the controller to admit or cut off current from the source of supply and substantially simultaneously close or open the branch circuits including the motors, thereby avoiding a closed loop circuit through the motors when the main circuit is opened.

4. The combination with a set of motors, of a set of motor circuits each including the field and armature of a motor normally arranged in series, a source of supply, a connection therefrom to the individual motor circuits in parallel, and means controlled by the controller to open or close said connection and substantially simultaneously make or break connection between the motor circuits.

5. The combination with a set of motors, of motor circuits arranged in parallel each of which includes the armature and field of a motor in series, thereby forming a loop circuit including a plurality of series motors, a reverser interposed in the several circuits and adapted when operated to reverse the current through one element of each motor, a controller, said motor circuits being open at a point in the loop including the several motor circuits when the controller is at its off position and means controlled by the controller to close the circuit at said point.

6. The combination with a set of motors, of an electric circuit in which the armature and field of each motor are arranged in series and in which the two motors are arranged in parallel, thereby forming a loop circuit including a plurality of series motors, a reverser interposed in said circuit adapted when operated to reverse the current through one element of each motor, a controller, and means controlled by the controller to admit or cut off current to the circuit and substantially simultaneously therewith to respectively close or open the circuit at a point in the loop including the two motors.

7. The combination with a set of motors, of an electric circuit, resistances in the circuit, branches, in the circuit beyond the resistances, in each of which the armature and field of a motor are normally included in series, a controller, and means controlled by the controller, in moving to or from its off position, to open or close the circuit in front of the resistances and in the branch circuit, thereby avoiding a closed loop circuit through the motors when the current to the motors is cut off.

8. The combination with a plurality of sets of motors, of an electric circuit in which the armature and field of a motor are normally arranged in series and in which the motors of each set are arranged normally in a loop to permit their operation in multiple, a controller, and means controlled thereby to open and close the circuit at a point in each loop including a set of motors.

9. The combination with a plurality of sets of motors, of an electric circuit in which the armature and field of each motor are normally arranged in series and in which the motors of each set are normally arranged in a loop to permit their operation in multiple, a controller, and means controlled thereby, in its movement from or to its off position, to admit or cut off current to the circuit and to close or open the circuit at a point in each loop including a set of motors.

10. The combination with a plurality of sets of motors, each of which has its armature and field normally arranged in series, of a source of current supply, resistances, a connection from the source of supply to the resistances, parallel circuits from the resistances through the motors of one set, parallel circuits through the motors of the other set, thereby forming loop circuits each including the motors of a set, a reverser interposed in the several circuits and adapted to be operated to reverse the current through one element of each motor, a controller, and means operated by the controller, in its movement to or from its off position, to open or close the connection between the source of supply and the resistances and to open and close a connection or connections in the loop including the motor circuits of each set.

11. The combination with a set of motors, of an electric circuit in which the armature and field of a motor are normally arranged in series and in which said motors are normally arranged in a loop to permit their operation in parallel, a controller, and means carried by the controller to open and close the circuit at a point in the loop including the several motors.

12. The combination with a set of motors, motor circuits each normally including the field and armature in series and normally arranged in a loop to permit the operation of said motors in parallel, of a source of current supply, resistances, a connection from the source of supply to the resistances, a connection from the resistances to each motor circuit, a reverser interposed in the motor circuits and adapted when operated to reverse the current through one element of each motor, and means carried by the controller adapted, in its movement from its first running position to its off position or vice versa, to open or close the said connection to the resistances and also open or close the circuit at a point in the loop including said motors.

13. The combination with a set of motors, of motor circuits each normally including a field and armature in series and normally arranged in parallel relation, disconnected controller brushes to which corresponding ends of the several motor circuits are respectively connected, and corresponding moving controller plates connected together and adapted, in the movement of the controller from its off to its first running position to respectively contact with said brushes.

14. The combination with a set of motors, of resistances, a source of current supply and a connection therefrom to the resistances, a controller, motor circuits each normally including a field and armature arranged in series and normally arranged in parallel and connected at one end with the resistances and at the other end with disconnected controller brushes, a reverser interposed in the motor circuits and adapted to be operated to reverse the direction of the current through one element of each motor, and means carried by the controller adapted to substantially simultaneously make or break the connection to the controller and connect or disconnect said controller brushes.

15. The combination with a plurality of sets of motors, of an electric circuit in which the armature and field of a motor are normally arranged in series and in which the motors of each set are normally arranged in a loop to permit their operation in parallel, a controller, and means carried by the controller to open and close the circuit at a point in each loop including a set of motors.

16. The combination with a plurality of sets of motors, and motor circuits in which the armature and field of each motor are normally arranged in series and in which the motors of each set are normally arranged in a loop to permit their operation in parallel, of a source of current supply, resistances, a connection from the source of supply to the resistances, a reverser interposed in the motor circuits and adapted when operated to reverse the current through an element of each motor, and means carried by the controller adapted, in its movement from its first running position to its off position or vice versa, to open or close the connection to the resistances and also open or close the circuit at a point in each loop including a set of motors.

17. The combination with a plurality of sets of motors, of motor circuits in which the motors of each set are normally arranged in parallel and in which the field and armature of each motor are normally arranged in series, disconnected controller brushes to each of which one end of a motor circuit is connected, and moving controller plates adapted to contact with the several brushes and thereby close the circuit between the ends of the motor circuits of each set and between the sets of motor circuits.

18. The combination with a plurality of sets of motors and motor circuits in which the motors of each set are arranged in parallel and in which the field and armature of each motor are normally arranged in series, of resistances, a source of current supply and a connection therefrom to the resistances, a reverser interposed in the motor circuits and adapted to be operated to reverse the direction of the current through one element of each motor, brushes to which the ends of the several motor circuits are respectively connected, and plates on the controller adapted, in the movement of the controller to or from its off position, to open or close the connection to the resistances and disconnect or connect the brushes of each set of motor circuits.

In testimony of which invention, I have hereunto set my hand, at Philadelphia, on this 11th day of February, 1909.

ARTHUR B. STITZER.

Witnesses:
 CHAS. T. MYERS,
 W. S. YOUNG.